United States Patent
Jung et al.

(10) Patent No.: US 9,596,032 B2
(45) Date of Patent: Mar. 14, 2017

(54) BI-DIRECTIONAL OPTICAL TRANSCEIVER MODULE

(71) Applicant: OPTO ELECTRONICS SOLUTIONS CO., LTD., Gwangju (KR)

(72) Inventors: Eun Kyo Jung, Seoul (KR); Dong Jin Shin, Gwangju (KR); Se Hee Han, Gwangju (KR)

(73) Assignee: OPTO ELECTRONICS SOLUTIONS CO., LTD., Gwangju (KR)

( * ) Notice: Subject to any disclaimer, the term of this patent is extended or adjusted under 35 U.S.C. 154(b) by 0 days.

(21) Appl. No.: 14/725,087

(22) Filed: May 29, 2015

(65) Prior Publication Data

US 2015/0349889 A1 Dec. 3, 2015

(30) Foreign Application Priority Data

May 29, 2014 (KR) .................. 10-2014-0065456

(51) Int. Cl.
*H04B 10/40* (2013.01)
*H04B 10/25* (2013.01)

(52) U.S. Cl.
CPC .......... *H04B 10/40* (2013.01); *H04B 10/2503* (2013.01)

(58) Field of Classification Search
CPC ..... H04B 10/40; G02B 6/2414; G02B 6/4215
See application file for complete search history.

(56) References Cited

U.S. PATENT DOCUMENTS

| 2005/0180755 A1* | 8/2005 | Masahiko | H04B 10/40 398/135 |
| 2010/0329669 A1* | 12/2010 | Cunningham | H04B 10/40 398/41 |

FOREIGN PATENT DOCUMENTS

| CN | 203606534 U | 5/2014 |
| JP | 2005-338782 A | 12/2005 |
| KR | 1020050081328 A | 8/2005 |
| KR | 1020120009785 A | 2/2012 |

OTHER PUBLICATIONS

Korea Office Action dated Sep. 1, 2015; Appln. No. 10-2014-0065456.
First Chinese Office Action issue date May 25, 2016; Appln. No. 201510268950.7.

* cited by examiner

*Primary Examiner* — David Payne
*Assistant Examiner* — Casey Kretzer
(74) *Attorney, Agent, or Firm* — Ladas & Parry LLP

(57) ABSTRACT

Disclosed is a bi-directional optical transceiver module, which is capable of effectively separating optical signals even when wavelength bands of a first optical signal output from an optical fiber and a second optical signal output from an optical transmitter are narrow.

7 Claims, 3 Drawing Sheets

BI-DIRECTIONAL OPTICAL TRANSCEIVER MODULE

TECHNICAL FIELD

The present invention relates to a bi-directional optical transceiver module used in optical communication.

BACKGROUND ART

In general, an optical module refers to a module in which various optical communication functions are collected in one package to be connected with an optical fiber. Recently, a bi-directional optical module, in which an optical transmitter using a laser diode, which has low power consumption and is utilizable for a long distance, as a light source, and an optical receiver performing optical communication by using a photodiode are modulated into one module, is mainly used.

The bi-directional optical module includes an optical transmitter, an optical receiver, an optical filter, an optical fiber, a holder for accommodating the optical fiber, and the like. A first optical signal (incident light) output from the optical fiber is reflected by the optical filter to be incident to the optical receiver, and a second optical signal (output light) output from the optical transmitter passes through the optical filter to be incident to the optical fiber.

The optical filter is generally disposed while being inclined at 45° to separate the first optical signal and the second optical signal, but when a wavelength interval between the first optical signal and the second optical signal is 60 nm or lower, particularly, in an environment at −40° C. to 85° C., it is impossible to separate the optical signals according to a property of the filter.

SUMMARY OF THE INVENTION

The present invention has been made in an effort to provide a bi-directional optical transceiver module which is capable of effectively separating optical signals even when wavelength bands of incident light and output light are narrow.

An exemplary embodiment of the present invention provides a bi-directional optical transceiver module, including: a holder into which an optical fiber for outputting a first optical signal is inserted, the first optical signal having an optical axis and a predetermined angle; an optical transmitter configured to output a second optical signal to the optical fiber; an optical receiver configured to receive the first optical signal; a first optical filter configured to reflect the first optical signal, and allow the second optical signal to pass through; and a reflector configured to reflect the first optical signal reflected by the first optical filter to the optical receiver side, in which a third angle between a second axis vertical to the optical axis and the first optical filter is smaller than a seventh angle between the second axis and the reflector.

A thickness of the first optical filter may be 0.5 to 1.2 mm.

A second angle between the optical axis and the first optical signal is smaller than a first angle between a third axis and an end of the optical fiber.

The third angle may be 8° to 18°.

The seventh angle may satisfy Relational Formula 3 below, $$\theta_7 = 45° - \left(\frac{\theta_1}{4} + \theta_3\right). \qquad \text{[Relational Formula 3]}$$

The first optical filter and the reflector may be mounted to the holder.

The holder may include a first inclined surface onto which the first optical filter is mounted, and a second inclined surface onto which the reflector is mounted.

An angle between the first inclined surface and a normal line vertical to the optical axis may be smaller than an angle between the second inclined surface and a normal line vertical to the optical axis.

According to the exemplary embodiment of the present invention, it is possible to effectively separate optical signals even when wavelength bands of the first optical signal and the second optical signal are narrow.

It is also possible to effectively separate light by varying only a shape of the holder in which the optical fiber is disposed, thereby reducing manufacturing cost, and simplifying an assembly process.

DETAILED DESCRIPTION

Figure 1:
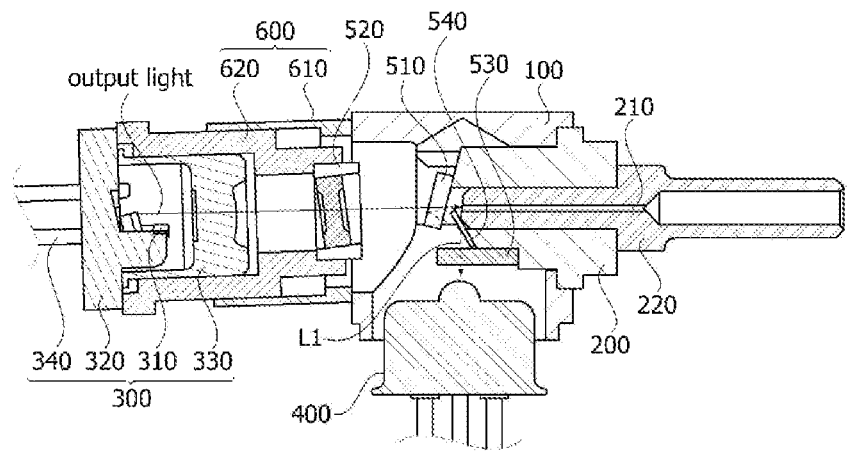
FIG. 1 is a conceptual diagram of a bi-directional optical transceiver module according to an exemplary embodiment of the present invention.

The present invention may be variously modified and have various embodiments thereof, and thus specific embodiments will be illustrated in the drawings and described in detail in detailed description.

However, this is not intended to limit the present invention to the specific exemplary embodiments, and it will be appreciated that the present invention includes all modifications, equivalents, or substitutions included in the spirit and the technical scope of the present invention.

Terms used in the present application are used only to describe specific exemplary embodiments, and are not intended to limit the present invention. Singular expressions used herein include plural expressions unless they have definitely opposite meanings.

In the present invention, it should be understood that term "include" or "have" indicates that a feature, a number, a step, an operation, a component, a part or a combination thereof described in the specification is present, but does not exclude a possibility of presence or addition of one or more other features, numbers, steps, operations, components, parts or combinations thereof, in advance.

It should be appreciated that the accompanying drawings of the present invention are exaggerated or reduced for convenience of the description.

Hereinafter, the present invention will be described in detail with reference to the drawings, the same or corresponding constituent elements are denoted by the same reference numerals regardless of reference numerals, and overlapping descriptions thereof will be omitted.

FIG. 1 is a conceptual diagram of a bi-directional optical transceiver module according to an exemplary embodiment of the present invention.

Referring to FIG. 1, a bi-directional optical transceiver module includes a holder 200 into which an optical fiber 210 for outputting a first optical signal is inserted, an optical transmitter 300 for outputting a second optical signal to the optical fiber 210, an optical receiver 400 for receiving the first optical signal output from the optical fiber 210, a first optical filter 510 for reflecting the first optical signal and allowing the second optical signal to pass through; and a reflector 540 for reflecting the second optical signal reflected by the first optical filter 510 to the optical receiver 400 side.

A case 100 is provided with a plurality of insertion holes into which the optical fiber 210, the optical transmitter 300, and the optical receiver 400 are inserted. The optical fiber 210 and the optical transmitter 300 may be disposed so as to face each other within the case 100, and the optical receiver 400 may be disposed in a direction vertical to a direction in which the optical fiber 210 is inserted. However, the present invention is not essentially limited thereto, and the optical transmitter 300 may be disposed in the direction vertical to the direction in which the optical fiber 210 is inserted.

The optical fiber 210 is disposed at one side of the case 100. The optical fiber 210 may be accommodated in the cylindrical holder 200, so that an end of the optical fiber 210 may be disposed inside the case 100. The optical fiber 210 transmits the second optical signal output from the optical transmitter 300 to the outside, or outputs the first optical signal received from the outside. The optical fiber 210 may be aligned by a ferrule 220.

The optical transmitter 300 transmits the second optical signal to the outside through the optical fiber 210. The second optical signal has a wavelength different from that of the first optical signal output from the optical fiber 210. A general TO CAN structure including the light source 310, a header (stem) 320, and a lens 330 is all applicable to the optical transmitter.

The light source 310 is formed of a semiconductor light emitting device, and converts an electric signal to an optical signal and outputs the converted signal. A laser diode may be used as the light source 310. Since the laser diode has low power consumption and a narrow spectrum width, the laser diode is capable of minutely collecting light at a high output, thereby being appropriate for a light source for optical communication.

The header 320, on which the light source 310 is seated, is formed in a disk shape, and a plurality of connection pins 340 passes through and is inserted into the header 320. The connection pins 340 form electric paths between the light source 310 and an external circuit board (not illustrated).

The lens 330 transmits the second optical signal output from the light source 310 to the optical fiber 210 side. The lens 330 may be disposed at an appropriate position so as to transmit the optical signal to the optical fiber 210.

A distance adjusting member 600 includes a first adjusting member disposed at the other side of the case 100, and a second adjusting member 620 inserted into and fixed to the first adjusting member 610. A distance, at which the second optical signal output from the optical transmitter 300 reaches the optical fiber 210, is adjusted according to a degree of insertion of the second adjusting member 620 into the first adjusting member 610. Accordingly, optical coupling efficiency of the optical transmitter 300 may be adjusted according to a degree of insertion of the second adjusting member 620 into the first adjusting member 610. The optical transmitter 300 is inserted into and fixed at one side of the second adjusting member 620.

The first adjusting member 610 and the second adjusting member 620 are manufactured in a hollow cylinder shape, and are formed to have different diameters. The second adjusting member 620 is inserted into the first adjusting member 610 at an appropriate position, and then is fixed by welding and the like. In this case, the appropriate position refers to a position at which demanded optical coupling efficiency of the second optical signal is adjusted.

The optical receiver 400 converts the first optical signal received from the outside through the optical fiber 210 into an electric signal. The optical receiver 400 may be formed of a photo diode. When an optical signal is incident to the photo diode, a reverse current proportional to a quantity of incident light flows. That is, the optical receiver 400 may change an output current according to the quantity of incident light, and convert the optical signal to an electrical signal.

The first optical filter 510 is an optical filter, and may be mounted in the holder 200 to be disposed between the optical transmitter 300 and the optical fiber 210.

The first optical filter 510 may be designed so as to allow only an optical signal of a specific wavelength to pass through. For example, the first optical filter 510 may allow the second optical signal output from the optical transmitter 300 to pass through, and reflect the first optical signal output from the optical fiber 210.

The first optical filter 510 is mounted in the holder 200 while having an inclination smaller than about 20° so that the optical signals are separable even when a wavelength interval between the first optical signal and the second optical signal is narrow.

The reflector 540 is mounted in the holder 200, and changes an optical path of the first optical signal reflected by the first optical filter 510 to the optical receiver 400 side. The reflector 540 may be manufactured by attaching a separate reflection member to the holder 200, but is not limited thereto, and a reflective layer may be directly formed in the holder 200.

A second optical filter 530 is an optical filter, and allows the first optical signal reflected by the first optical filter 510 and the reflector 540 to pass through. The first optical signal passing through the second optical filter 530 is transmitted to the optical receiver 400 to be converted into the electrical signal by the optical receiver 400.

An isolator 520 blocks the optical signal received while being reflected by the optical fiber 210 and an optical component included in the optical module. Since the first optical signal normally received from the outside has a wavelength different from that of the second optical signal, the first optical signal is reflected by the first optical filter 510 to be transmitted to the optical receiver 400. However, the second optical signal may be reflected by the optical fiber 210 or other optical components, and the reflected second optical signal may be transmitted to the optical transmitter 300 again. Accordingly, the isolator 520 may block the optical signal reflected by the optical fiber 210 or the optical component to remove a reflective noise.

The isolator 520 may include a polarizer and an analyzer for allowing only an optical signal having a predetermined polarization component to pass through, and a faraday rotator for linear polarizing and rotating the optical signal input into the inside.

Figure 2:
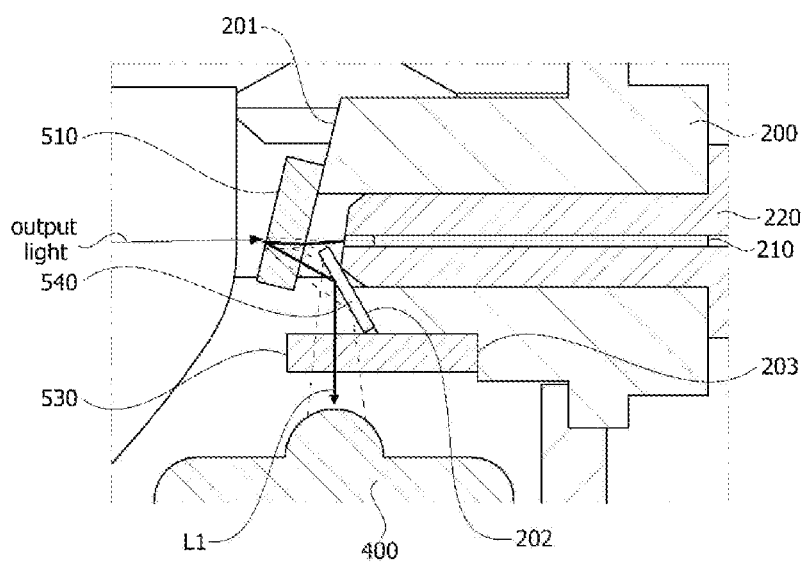
FIG. 2 is a diagram for describing a process in which a first optical signal output from an optical fiber is incident to an optical receiver according to an exemplary embodiment of the present invention.
Figure 3:
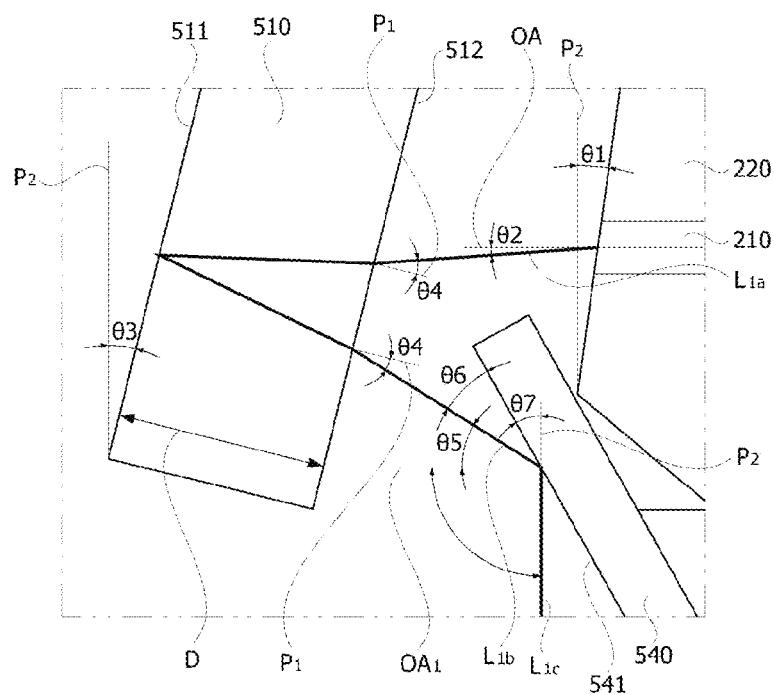
FIG. 3 is a diagram for describing positions of a first optical filter and a reflector disposed so that a first optical signal output from an optical fiber is incident to an optical receiver according to an exemplary embodiment of the present invention.
Figure 4:
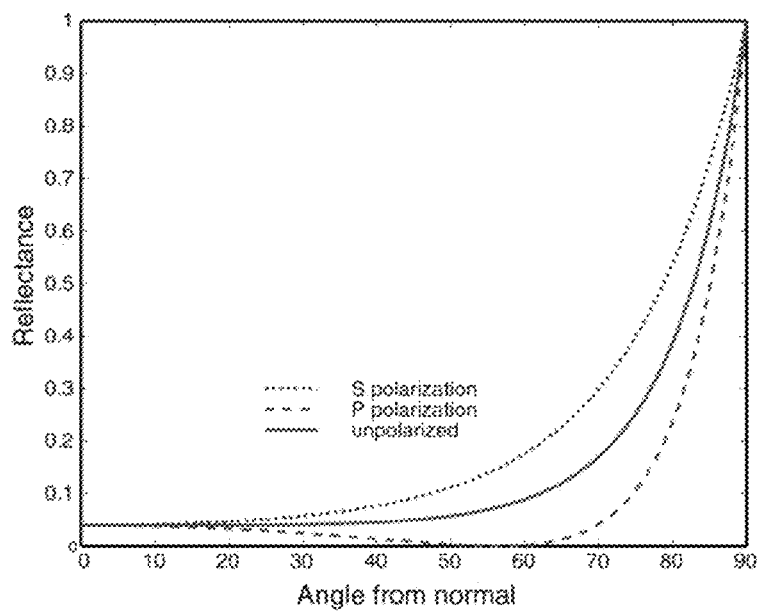
FIG. 4 is a graph illustrating a reflectance curve of an S wave and a P wave according to an incident angle.
Figure 5:
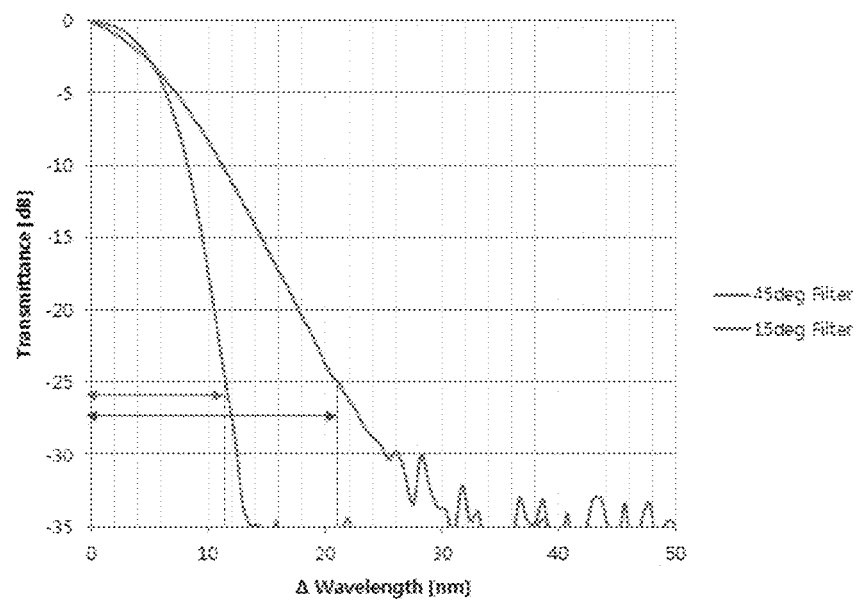
FIG. 5 is a graph showing a transmittance curve of a 45° filter in the related art and a 15° filter of the present invention.

FIG. 2 is a diagram for describing a process in which a first optical signal output from an optical fiber is incident to an optical receiver according to an exemplary embodiment of the present invention, FIG. 3 is a diagram for describing positions of a first optical filter and a reflector disposed so that a first optical signal output from an optical fiber is incident to an optical receiver according to an exemplary embodiment of the present invention, FIG. 4 is a graph illustrating a reflectance curve of an S wave and a P wave according to an incident angle, and FIG. 5 is a graph showing a transmittance curve of a 45° filter in the related art and a 15° filter of the present invention.

Referring to FIG. 2, a first optical signal L1 output from the optical fiber 210 is first reflected by the first optical filter 510, and secondarily reflected by the reflector 540 again to be vertically incident to the optical receiver 400. An end part of the holder 200 is provided with a first inclined surface 201 on which the first optical filter 510 is mounted at one side based on the optical fiber 210, and a second inclined surface 202 on which the reflector 540 is mounted at the other side based on the optical fiber 210.

In order to make the first optical signal L1 be incident to the optical receiver 400, an inclination angle of the first inclined surface 201 may be designed to be smaller than an inclination angle of the second inclined surface 202. Here, the inclination angle may be defined as an angle between a vertical line P2 (see FIG. 3) and the inclined surface. Through the aforementioned configuration, the angle is accurately adjusted only by mounting the first optical filter 510 and the reflector 540 on the inclined surfaces 201 and 202 of the holder 200, thereby improving reliability and considerably making it easier to manufacture the module.

A step part 203, on which the second optical filter 530 is mounted, may be formed in the holder 200. Through the aforementioned configuration, the first optical filter 510, the reflector 540, and the second optical filter 530 are disposed at appropriate positions of the holder 200, thereby optimizing receiving sensitivity.

Referring to FIG. 3, an end of the optical fiber 210 may be ground so as to have a first angle ($\theta 1$) with a second axis P2 vertical to an optical axis OA. A second angle ($\theta 2$) between a first optical path L1a of the second optical signal L1 output from the optical fiber 210 and the optical axis OA may be about ½ of the first angle ($\theta 1$). Particularly, the first angle and the second angle is determined by the Snell's Law. For example, when a refractive index of an optical fiber core is 1.5 (based on 1.0 of the refractive index of air), the first angle ($\theta 1$) may be about 8°, and the second angle ($\theta 2$) may be about 4°. However, the angles are not essentially limited thereto, and the inclination angle and the light output angle of the end of the optical fiber 210 may be variously modified according to the type of optical module. For example, the first angle ($\theta 1$) may be about 6°, and the second angle ($\theta 2$) may be about 3°.

The optical axis OA of the optical fiber defined in the present specification may be defined as an extended direction of the optical fiber, or an ideal optical output path in which light is output when the end of the optical fiber is not ground. Further, the optical path refers to a main path of output light.

The first optical signal output from the optical fiber is incident to an incident surface 512 of the first optical filter 510. The first optical filter 510 may be inclined at a third angle ($\theta 3$) based on the second axis P2. The third angle ($\theta 3$) may be about 8° to 18°.

When the third angle ($\theta 3$) is smaller than 8°, there is a problem in that the first optical signal reflected with the decreased reflection angle is incident to the optical fiber 210 again or, loss is generated due to interference, so that receiving sensitivity deteriorates, and when the third angle ($\theta 3$) is greater than 8°, there is a problem in that a transflective curve of the optical filter is distorted by a filter reflectance difference according to polarization, so that a property of the optical filter is degraded.

Referring to FIG. 4, it can be seen that when an incident angle, at which the first optical signal is incident to the first optical filter 510, is greater than about 18°, a reflectance difference between S polarization and P polarization is sharply increased.

Accordingly, when the third angle ($\theta 3$) is adjusted within about 8° to 18°, the reflectance difference according to the polarization direction is decreased, so that it is possible to effectively separate the optical signals when wavelength band widths of the first optical signal and the second optical signal are small, compared to the optical filter disposed at 45° in the related art.

A fourth angle ($\theta 4$) between the second axis P2 vertical to the first optical filter 510 and the first optical path L1a of the first optical signal may satisfy Relational Formula 1 below.

$$\theta 4 = \theta 2 + \theta 3 \quad \text{[Relational Formula 1]}$$

For example, when the second angle ($\theta 2$) is about 4°, and the third angle ($\theta 3$) is about 15°, the fourth angle ($\theta 4$) may be set to about 19°.

The first optical signal passing through the incident surface 512 of the first optical filter 510 is refracted to move into the first optical filter 510, and is reflected by a reflective surface 511 of the first optical filter 510. In this case, an angle between a second optical path L1b of the first optical signal reflected and passing through the first optical filter 510 and the first axis P1 may be designed to be the same as the fourth angle ($\theta 4$). To this end, the first optical filter 510 may be manufactured to have a thickness D of about 0.5 mm to 1.2 mm.

When the thickness D of the first optical filter 510 is smaller than 0.5 mm, it is difficult to manufacture the filter, thereby increasing manufacturing cost, and when the thickness D of the first optical filter 510 is greater than 1.2 mm, loss is generated when light is received by the reflector, thereby degrading receiving sensitivity.

The first optical signal reflected by the first optical filter 510 moves along the second optical path L1b, a sixth angle ($\theta 6$) between the second optical path L1b of the first optical signal and a reflective surface 541 of the reflector 540 satisfies Relational Formula 2 below.

$$\theta 6 = \left( \frac{\theta 4 + \theta 3 + 90°}{2} \right) - (\theta 4 + \theta 3) \quad \text{[Relational Formula 2]}$$

The sixth angle ($\theta 6$) may be 27° to 35°. For example, when the second angle ($\theta 2$) is about 4°, and the third angle ($\theta 3$) is about 15°, the sixth angle ($\theta 6$) may be set to about 28°.

A seventh angle ($\theta 7$) between the second axis P2 and the reflective surface 541 of the reflector may be designed to be the same angle as the sixth angle ($\theta 6$). A part, at which an angle is adjustable, is the first angle (θ1) and the third angle (θ3), and the seventh angle (θ7) may be expressed by Relational Formula 3 below.

$$\theta_7 = 45° - \left(\frac{\theta_1}{4} + \theta_3\right)$$ [Relational Formula 3]

In order to make the light be vertically incident to the optical receiver 400, the reflector 540 needs to be disposed so as to satisfy Relational Formula 3. The seventh angle (θ7) may be 26° to 35°. For example, when the first angle (θ1) is about 8°, and the third angle (θ3) is about 15°, the seventh angle (θ7) may be set to about 28°.

A fifth angle (θ5) between the second optical path L1*b* of the first optical signal and a virtual line OA1 horizontal to the optical axis OA satisfies Relational Formula 4 below.

θ5=90°−(2×θ7)   [Relational Formula 4]

In this case, since the sixth angle (θ6) is the same as the seventh angle (θ7), the fifth angle (θ5) may also be expressed by 90°−(2×θ6).

Through the configuration, there is an advantage in that it is possible to easily separate a wavelength even when a wavelength interval between the first optical signal and the second optical signal is equal to or smaller than 60 nm. Referring to FIG. 5, it can be seen that, in order to obtain 25 dB isolation, the first optical signal and the second optical signal need to have a wavelength interval of about 21 nm in the 45° filter, but the 15° filter sufficiently exhibits performance even though the first optical signal and the second optical signal has a wavelength interval of 11 nm.

Figure 6:
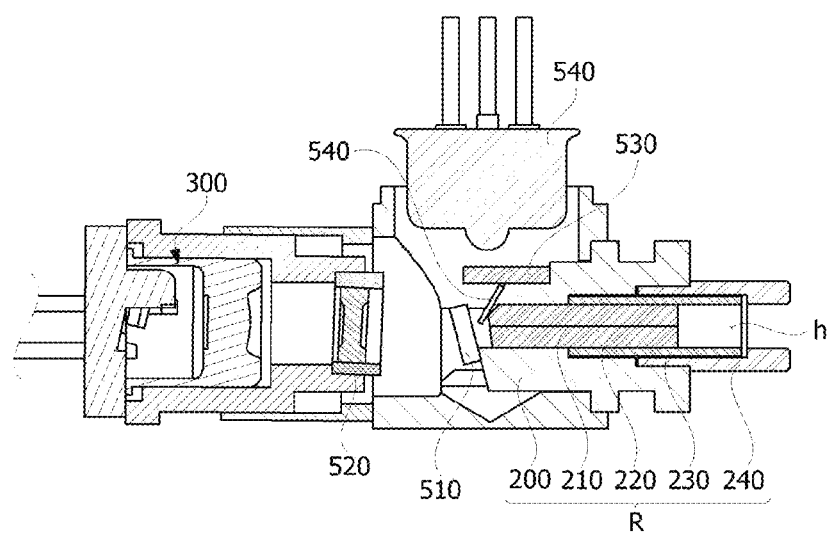
FIG. 6 is a conceptual diagram of a bi-directional optical transceiver module according to another exemplary embodiment of the present invention.

Referring to FIG. 6, the bi-directional optical transceiver module according to the present invention includes a receptacle R to and from which an optical connector (not illustrated) is attachable and detachable. The receptacle R includes the holder 200, a stub 220, one end of which is inserted into the holder 200, and in which the optical fiber is disposed, a sleeve 230 inserted into the holder 200, and a connector housing 240 inserted into the holder 200. The connector housing 240 is provided with an accommodation space h having an opened internal space into which an external optical connector is insertable.

What is claimed is:

1. A bi-directional optical transceiver module, comprising:
a holder into which an optical fiber for outputting a first optical signal is inserted, the first optical signal having an optical axis;
an optical transmitter configured to output a second optical signal to the optical fiber;
an optical receiver configured to receive the first optical signal;
a first optical filter configured to reflect the first optical signal, and allow the second optical signal to pass through;
a reflector configured to reflect the first optical signal reflected by the first optical filter to the optical receiver side; and
a second optical filter disposed between the reflector and the optical receiver,
wherein a first inclined angle between the first optical filter and a first axis is smaller than a second inclined angle between the reflector and a second axis, wherein the first axis and the second axis are parallel to each other and are perpendicular to the optical axis,
wherein a first light emitted from the holder and incident to the first optical filter does not cross a second light which is reflected by the reflector and is incident to the optical receiver,
wherein the holder comprises a first inclined surface in which the first optical filter is disposed, a second inclined surface in which the reflector is disposed, and a step part in which the second optical filter is disposed.

2. The bi-directional optical transceiver module of claim 1, wherein a thickness of the first optical filter is 0.5 to 1.2 mm.

3. The bi-directional optical transceiver module of claim 1, wherein a second angle between the optical axis and the first optical signal is smaller than a first angle between an end of the optical fiber and a third axis perpendicular to the optical axis.

4. The bi-directional optical transceiver module of claim 1, wherein the first inclined angle is 8° to 18°.

5. The bi-directional optical transceiver module of claim 3, wherein the second inclined angle satisfies Relational Formula 3below, $$\theta_7 = 45° - \left(\frac{\theta_1}{4} + \theta_3\right)$$ [Relational Formula 3]

where θ1 is the first angle, θ3 is the first inclined angle, θ7 is the second inclined angle.

6. The bi-directional optical transceiver module of claim 1, wherein an angle between the first inclined surface and a normal line perpendicular to the optical axis is smaller than an angle between the second inclined surface and a normal line perpendicular to the optical axis.

7. The bi-directional optical transceiver module of claim 1, further comprising:
a stub fixed to the holder and including the optical fiber disposed therein, a sleeve coupled to the holder, and a connector housing,
wherein the connector housing has an accommodation space to and from which an optical connector is attachable and detachable.

* * * * *